Figure 1:
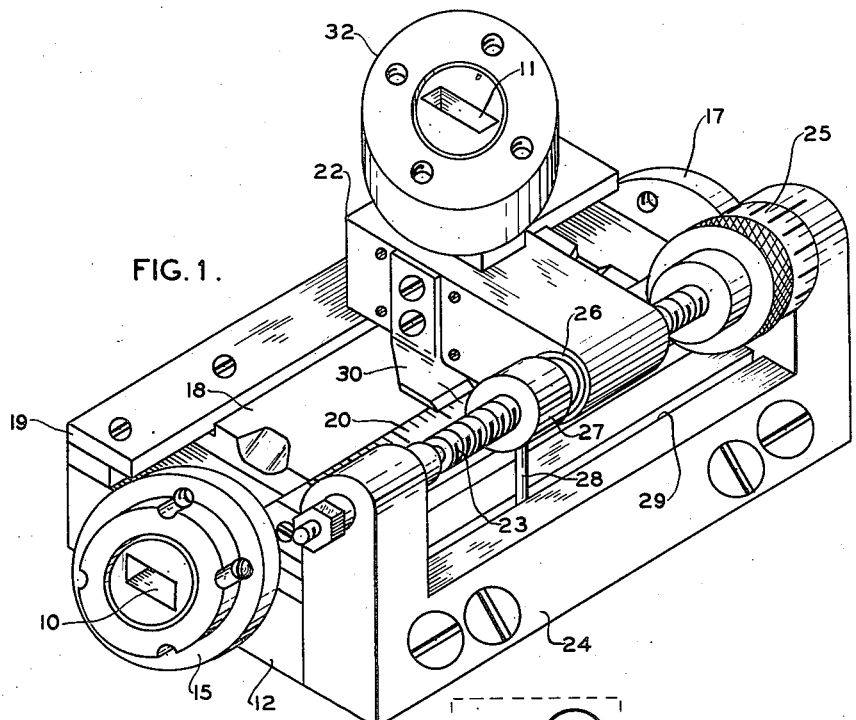

Oct. 9, 1951 A. T. NORDSIECK 2,571,055
TRAVELING DETECTOR FOR WAVES PROPAGATED THROUGH A WAVE GUIDE
Filed Nov. 27, 1945

INVENTOR.
ARNOLD T. NORDSIECK
BY
William D. Hall,
ATTORNEY

UNITED STATES PATENT OFFICE 2,571,055

TRAVELING DETECTOR FOR WAVES PROPAGATED THROUGH A WAVE GUIDE

Arnold T. Nordsieck, New York, N. Y., assignor to the United States of America as represented by the Secretary of War Application November 27, 1945, Serial No. 631,175

4 Claims. (Cl. 171—95)

The present invention relates broadly to ultra-high-frequency transmission circuits and more particularly to a traveling detector for centimeter waves which are propagated through a wave guide or other enclosed transmission line.

Standing waves are set up in wave guides whenever they are terminated in an impedance at variance with their characteristic impedance. An absence of standing waves indicates a proper impedance match. One form of apparatus employed in the measurement of standing waves is commonly known as the traveling detector. A traveling detector is a pick up and indicating device associated with and which is movable lengthwise along a guide and which measures the relative field intensity therein as a function of distance. Some principal applications of this device are for the determination of the resistive and reactive components of a load at a specified frequency, to adjust input systems of receivers for correct match to a line, etc.

Conventional traveling detectors usually consist of a coaxial transmission line or wave guide having a longitudinal slot and a probe which may be inserted through the slot and moved along the length of the guide or line. The probe serves to couple a small portion of the energy from the guide to a direct current meter through a suitable rectifier or detector. The ratio of maximum voltage to minimum voltage derived from the probe is known as the standing wave ratio.

It has been found that the slotted type of traveling detector introduces inaccuracies when used for waves in the centimeter region and also is subject to voltage breakdown. These inaccuracies arise by reason of reflection due to the relatively wide slot required to accommodate the probe and variations in contact impedance between the probe and the inner surfaces of the wave guide. Because of the small cross sectional dimension of a centimeter wave guide and the high density of electrical energy transmitted therethrough, the proximity of the probe to the guide surface may be such as to cause breakdown.

Accordingly it is the primary object of this invention to obviate the deficiencies of traveling detectors heretofore known by providing a new and improved traveling wave detector of high accuracy.

It is another object of this invention to provide a traveling detector employing a wave guide wherein the characteristic impedance is uniform for all positions of the detector and wherein coupling between the detector and the guide is effected without the need of an open slot.

It is another object of this invention to provide a traveling detector of sturdy and compact construction.

Briefly stated the above objects are attained in a preferred embodiment by means of a main wave guide formed by a passage in a flat plate, said passage being of uniform rectangular cross section and being offset for a portion of its length so as to be aligned with the upper surface of the plate thereby opening the wave guide for the length of the offset, the design of which will be described hereinafter. Covering this opening is a sliding wall whose length is such as to cover the opening within the extremes of its movement. Attached to the sliding wall is a stub wave guide which is coupled to the main guide passage by means of an iris formed in the sliding wall, the iris being shifted from one end of the opening to the other in the course of a full movement of the sliding wall. Thus, the stub guide derives a portion of the energy in the main guide at any position along the length of the offset portion thereof without introducing an impedance discontinuity in the main guide or the insertion of a probe therein.

For a better understanding of the invention as well as other objects and further features thereof reference is had to the following detailed description to be read in connection with the accompanying drawing wherein like components are designated by like numerals.

Figure 2:
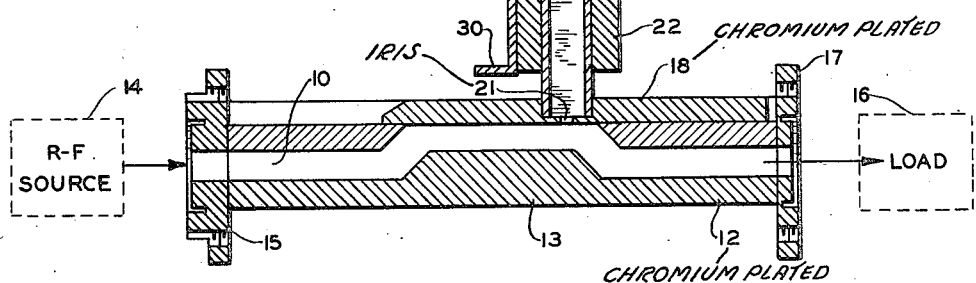

In the drawing:

Figure 1 shows in an isometric view a preferred embodiment of a traveling detector in accordance with the invention, and Figure 2 is a longitudinal section of said embodiment.

Referring now to Figures 1 and 2, the traveling detector comprises a main guide 10 and a sliding stub guide 11 coupled to said main guide. The walls of main guide 10 are defined by a rectangular bore of uniform cross section extending longitudinally through a rectangular base plate 12. The path taken by the bore is laterally or transversely offset or stepped at the central portion 13 of plate 12 so that a boundary of the bore is aligned with the upper surface of the plate thereby opening the guide 10 for the length of the offset. To enable mechanical coupling between guide 10 and a source of radio frequency energy, indicated by dashed block 14, a circular flange 15 is secured to one end of base plate 12, said flange having a central rectangular aperture coinciding with main guide 10. Similarly, to couple guide 10 to an output load circuit 16 a circular flange 17 is secured to the other end of base plate 12, said flange having a rectangular central aperture coinciding with wave guide 10.

Covering the opening in guide 10 is a sliding wall 18 in the form of rectangular slat which is arranged to slide lengthwise along the upper surface of base plate 12 in a channel erected by bars 19 and bars 20, affixed in parallel positions at opposite sides of the upper surface of base plate 12. The movement of sliding wall 18 is restricted at one end by flange 15 and at the other end by flange 17 and the length of sliding wall 18 is such as to cover the opening in guide 10 within the limits of its movement. Stub guide 11 is vertically mounted on sliding wall 18 in a central position and is electrically coupled to main guide 10 by means of a suitable iris 21 formed in sliding wall 18, said iris serving to couple a small portion of the energy in main guide 10 to stub guide 11 for all positions along the length of the opening in main guide 10.

Vernier movement of sliding wall 18 is effected by means of a screw operated arm 22 having a rectangular aperture at one end to snugly receive stub guide 11 and a threaded bore at the other end to receive a screw shaft 23. Screw shaft 23 is pivoted at its ends by means of a trunnion support 24 whose base is secured to one side of plate 12, the trunnion pins being inserted into suitable recesses at the ends of the screw shaft. By rotating the head 25 of screw shaft 23, head 25 being partially knurled for this purpose, arm 22 is caused to advance along the axis of the shaft, thereby shifting the position of stub guide 11 with respect to main guide 10. The position of iris 21 is such that it traverses the full length of the opening in main guide 10 in the course of a full movement of sliding wall 18.

Pressure is applied against arm 22 to prevent undesirable play, the pressure being provided by a helical spring 26 concentric with the shaft screw 23 and forced between one side of arm 22 and an adjacent threaded ring 27. A pin 28 projects from ring 27 and rides in a longitudinal groove 29 cut in the base of trunnion support 24 serving to prevent rotation of the ring and causing it to travel with arm 22. The upper surface of bar 20 is inscribed with suitable indicia to enable calibration of the movement of sliding wall 18, the position of the sliding wall being read by means of a pointer 30 carried by arm 22. A divisional reading of the indicia along bar 20 is afforded by means of indicia circumferentially inscribed on head 25.

To enable mechanical coupling of stub guide 11 to a detector 31, schematically indicated in Figure 2, a circular flange 32 is attached to the end of the stub guide, the flange having a central rectangular aperture coinciding with the stub guide passage. Detector 31 is of conventional form and comprises a direct current indicator 33 connected to any suitable probe 34 through a crystal rectifier 35.

It is to be noted that the characteristic impedance of main wave guide 10 is unvaried throughout its length and that the presence of stub guide 11 in any position does not introduce discontinuity to the main wave guide. This is possible because of the stepped form of the main wave guide 10 which enables a uniform cross section throughout while at the same time providing an opening in the guide.

It is desirable in the construction of the device to carefully lap the upper surface of plate 12 and the under surface of sliding wall 18 in order that their surfaces be perfectly level so that the guide is always fully enclosed.

The design of the offset portion of the guide which has been referred to hereinbefore in the specification is such that the double bend at either end of the offset portion of the wave guide is designed to maintain an impedance match between the non-offset portions and the offset portion of the wave guide over a wide range of frequencies. This is accomplished by making each bend a symmetrical mitered bend of the same angle and by making the distance between the two bends of each double bend therefor, measured parallel to the slanting portion of the wave guide, equal to one quarter of the guide wave length at midband.

In actual practice the materials forming the guide 10 have been chromium plated and then lapped or polished to a high finish. Also the sliding wall 18 has been chromium plated and highly polished. It has been found that this treatment provides a particularly good arrangement for sliding electrical contacts associated with apparatus in which relatively high power microwave transmission takes place. Since it has the requisite characteristic of providing surfaces of extreme hardness to resist wear and scoring, and further it has high electrical conductivity and thirdly it has the ability to form a good unlubricated bearing, it forms a highly desirable transmission medium particularly for microwave transmission.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

What is claimed is:

1. A traveling detector comprising an element of conducting material provided with a bore extending therethrough to define a wave guide; said bore comprising a first portion, a second portion offset laterally therefrom and having a boundary aligned with an outer surface of said element thereby providing an opening along said wave guide, and a third portion connecting said first portion with said second portion and forming a bend with each said first and second portion, the distance between said bends being substantially a quarter of the guide wave length at the midband frequency of the operating frequencies; a wall arranged to cover said opening, said wall being movable along said wave guide and being provided with an aperture, and means coupled to said wave guide by said aperture for indicating the magnitude of wave energy in said wave guide at the position of said aperture.

2. In a high frequency transmission circuit, an element of conducting material provided with a bore extending therethrough to define a main wave guide, said bore having a stepped portion, said stepped portion having a first section at a first level connected to a second section at a second level by an intermediate section, said second section being aligned with an outer surface of said element, thereby defining an opening in said main wave guide, said intermediate section defining a bend with each said first and second section, the distance between said bends being substantially a quarter of the guide wave length at the midband frequency of the operating frequencies, a sliding wall arranged to cover said opening, said wall being movable along said main wave guide and being provided with an iris, a stub wave guide mounted on said sliding wall and coupled to said main wave guide by said iris, and means coupled to said stub wave guide for indicating the magnitude of wave energy in said main wave guide at the position of said iris.

3. A traveling detector comprising a metal plate provided with a bore of rectangular cross-section extending longitudinally therethrough to define a main wave guide; said bore comprising a first portion, a second portion spaced longitudinally from said first portion, a third portion offset laterally from an intermediate said first and second portions, said third portion being aligned with an outer surface of said plate, thereby defining an opening in said surface, fourth and fifth portions connecting said third portion to said first and second portions, respectively, said fourth portion forming a pair of substantially equal and opposite bends with said first and third portions, said fifth portion forming a pair of substantially equal and opposite bends with said second and third portions, the distance between the bends of each pair being substantially a quarter of the guide wave length at the midband frequency of the operating frequencies, a wall arranged to cover said opening, said wall being provided with an iris and being movable along said main wave guide so that said iris traverses the length of said opening without exposure of said main wave guide, a stub wave guide mounted on said sliding wall and coupled to said main wave guide by said iris, and means coupled to said stub wave guide for indicating the magnitude of wave energy in said main wave guide at the position of said iris.

4. A detector according to claim 3 in which said outer surface of said element and the inner surface of said covering wall are plated with polished chromium.

ARNOLD T. NORDSIECK.

REFERENCES CITED

The following references are of record in the file of this patent:

UNITED STATES PATENTS

| Number | Name | Date |
|--------|------|------|
| 2,106,713 | Bowen | Feb. 1, 1938 |
| 2,191,271 | Carter | Feb. 20, 1940 |
| 2,197,123 | King | Apr. 16, 1940 |
| 2,358,462 | Mahren | Sept. 19, 1944 |
| 2,365,207 | Moles | Dec. 19, 1944 |
| 2,403,289 | Korman | July 2, 1946 |
| 2,404,797 | Hansen | July 30, 1946 |
| 2,405,814 | Brannin | Aug. 13, 1946 |
| 2,407,267 | Ginzton | Sept. 10, 1946 |
| 2,418,809 | Abersheim | Apr. 15, 1947 |
| 2,423,526 | Sontheimer et al. | July 8, 1947 |
| 2,437,889 | Nordsieck | Mar. 16, 1948 |
| 2,445,348 | Ford | July 20, 1948 |
| 2,448,623 | Rose | Sept. 7, 1948 |